United States Patent
Jung et al.

(10) Patent No.: US 10,212,742 B2
(45) Date of Patent: Feb. 19, 2019

(54) D2D OPERATION METHOD PERFORMED BY TERMINAL IN WIRELESS COMMUNICATION SYSTEM AND TERMINAL USING SAME

(71) Applicant: LG ELECTRONICS INC., Seoul (KR)

(72) Inventors: Sunghoon Jung, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 15/112,673

(22) PCT Filed: Jan. 30, 2015

(86) PCT No.: PCT/KR2015/001025
§ 371 (c)(1),
(2) Date: Jul. 19, 2016

(87) PCT Pub. No.: WO2015/115861
PCT Pub. Date: Aug. 6, 2015

(65) Prior Publication Data
US 2017/0006651 A1    Jan. 5, 2017

Related U.S. Application Data

(60) Provisional application No. 61/933,809, filed on Jan. 30, 2014, provisional application No. 61/935,705, filed on Feb. 4, 2014.

(51) Int. Cl.
H04W 4/00      (2018.01)
H04W 76/14     (2018.01)
(Continued)

(52) U.S. Cl.
CPC ......... *H04W 76/14* (2018.02); *H04W 48/16* (2013.01); *H04W 72/04* (2013.01)

(58) Field of Classification Search
CPC ... H04W 76/023; H04W 48/16; H04W 72/04; H04W 76/14
(Continued)

(56) References Cited

U.S. PATENT DOCUMENTS

2011/0250886 A1* 10/2011 Park ............... H04B 7/2606
                                                 455/436
2013/0322388 A1   12/2013 Ahn et al.
(Continued)

FOREIGN PATENT DOCUMENTS

CN    102858012    1/2013
CN    103517371    1/2014
(Continued)

OTHER PUBLICATIONS

Korean Intellectual Property Office Application No. 10-2016-7019121, Notice of Allowance dated Jan. 10, 2018, 2 pages.
(Continued)

*Primary Examiner* — Sai Ming Chan
(74) *Attorney, Agent, or Firm* — Lee Hong Degerman Kang Waimey

(57) ABSTRACT

Provided are a device-to-device (D2D) operation method performed by a terminal in a wireless communication system and a terminal using the method. The method comprises: receiving D2D configuration information from a network, the D2D configuration information indicating a resource that can be used in the D2D operation within coverage of the network; and when a transmitting condition is satisfied, transmitting a D2D message to a second terminal, the D2D message including resource information indicating a resource that can be used in the D2D operation.

14 Claims, 24 Drawing Sheets

(51) Int. Cl.
*H04W 48/16* (2009.01)
*H04W 72/04* (2009.01)

(58) Field of Classification Search
USPC .......................................................... 370/329
See application file for complete search history.

(56) References Cited

U.S. PATENT DOCUMENTS

| | | | |
|---|---|---|---|
| 2014/0112194 A1* | 4/2014 | Novlan | H04W 48/16 370/254 |
| 2014/0328329 A1* | 11/2014 | Novlan | H04W 72/042 370/336 |
| 2016/0183276 A1* | 6/2016 | Marinier | H04W 72/02 370/329 |
| 2016/0227518 A1* | 8/2016 | Li | H04W 72/042 |
| 2016/0242144 A1* | 8/2016 | Adachi | H04W 76/14 |
| 2016/0323868 A1* | 11/2016 | Kalhan | H04W 72/1278 |

FOREIGN PATENT DOCUMENTS

| | | | |
|---|---|---|---|
| WO | 2013062351 A1 | 5/2013 | |
| WO | 2013115567 A1 | 8/2013 | |
| WO | 2013149665 A1 | 10/2013 | |
| WO | 2013191522 A1 | 12/2013 | |

OTHER PUBLICATIONS

Catt, "MAC functions for D2D communication", R2-140071, 3GPP TSG RAN WG2 Meeting #85, Feb. 2014, 4 pages.
Etri, "Fully scheduled D2D transmission in LTE-coverage", R2-134095, 3GPP TSG-RAN WG2 #84, Nov. 2013, 3 pages.
Korean Intellectual Property Office Application No. 10-2016-7019121, Office Action dated Aug. 8, 2017, 4 pages.
Catt, "Resource Pool for D2D Communication", R2-140070, 3GPP TSG RAN WG2 Meeting #85, Feb. 2014, 3 pages.
Itri, "Discussion on Resource Pool for D2D Communication", R2-140171, 3GPP TSG RAN WG2 #85, Feb. 2014, 3 pages.
State Intellectual Property Office of the People's Republic of China Application No. 201580006506.6, Office Action dated Oct. 8, 2018, 7 pages.

* cited by examiner

D2D OPERATION METHOD PERFORMED BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2015/001025, filed on Jan. 30, 2015, which claims the benefit of U.S. Provisional Application Nos. 61/933,809, filed on Jan. 30, 2014 and 61/935,705, filed on Feb. 4, 2014, the contents of which are all hereby incorporated by reference herein in their entirety.

BACKGROUND OF THE INVENTION

Field of the Invention

The present invention relates to wireless communication, and more particularly to a D2D operation performed by a terminal in a wireless communication system and a terminal using the same.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, user equipment (UE) may perform a D2D operation with another terminal using D2D configuration provided from a network in coverage of a network. However, the terminal or another terminal may be moved to be separated from network coverage.

The terminal separated from the network coverage may perform the D2D operation may perform the D2D operation using a preset configured resource. However, the preset configured resource may differ from a resource according to D2D configuration provided from the network. In this case, loss may be caused in the D2D operation performed by the terminals. The above may interfere with another terminal performing the D2D operation.

There is a need for a D2D operation method and an apparatus thereof capable of solving the above problem.

SUMMARY OF THE INVENTION

The present invention provides a D2D operation method performed by a terminal in a wireless communication system and a terminal using the same.

In one aspect, provided is a device-to-device (D2D) operation method performed by a first terminal in a wireless communication system. The D2D operation method includes receiving D2D configuration information from a network, the D2D configuration information indicating a resource that can be used in the D2D operation within coverage of the network and when a transmitting condition is satisfied, transmitting a D2D message to a second terminal, the D2D message including resource information indicating a resource that can be used in the D2D operation.

In another aspect, provided is a terminal for performing a D2D operation in a wireless communication system. The terminal includes a RF unit configured to send and receive radio signals and a processor connected to the RF unit to be operated. The processor receives D2D configuration information from a network, the D2D configuration information indicating a resource that can be used in the D2D operation within coverage of the network and transmits a D2D message to a second terminal when a transmitting condition is satisfied, the D2D message including resource information indicating a resource that can be used in the D2D operation.

According to the present invention, a terminal in coverage of a network may transfer resource information indicating a resource which may be used in a D2D operation in the coverage to a terminal located outside the coverage. The terminal located outside the coverage may perform the D2D operation using a resource indicated by the resource information instead of the preset configured resource. Accordingly, the D2D operation may be performed between terminals located inside and outside a boundary of the network coverage without loss. Further, the interference occurrence may be reduced in the D2D operation between terminals included in different groups.

DESCRIPTION OF EXEMPLARY EMBODIMENTS

Figure 1:
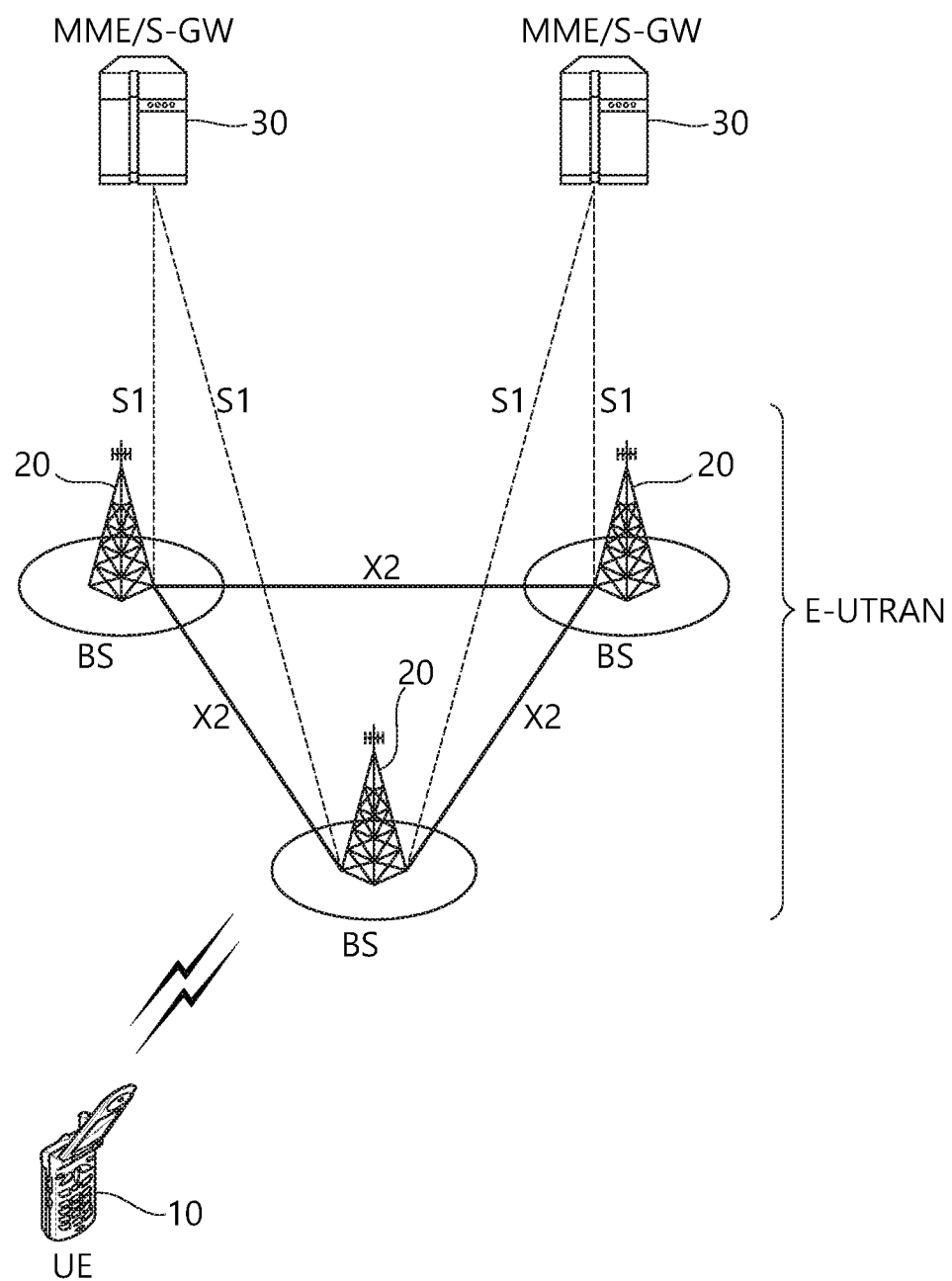
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
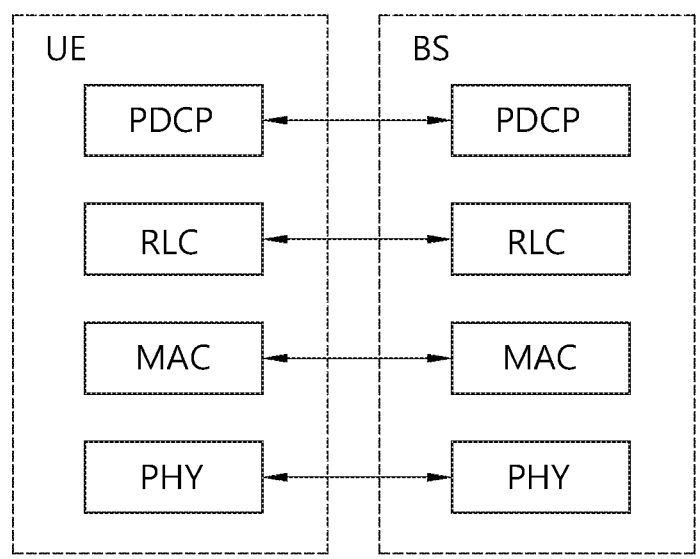
FIG. 2 is a diagram showing a wireless protocol architecture for a user plane.
Figure 3:
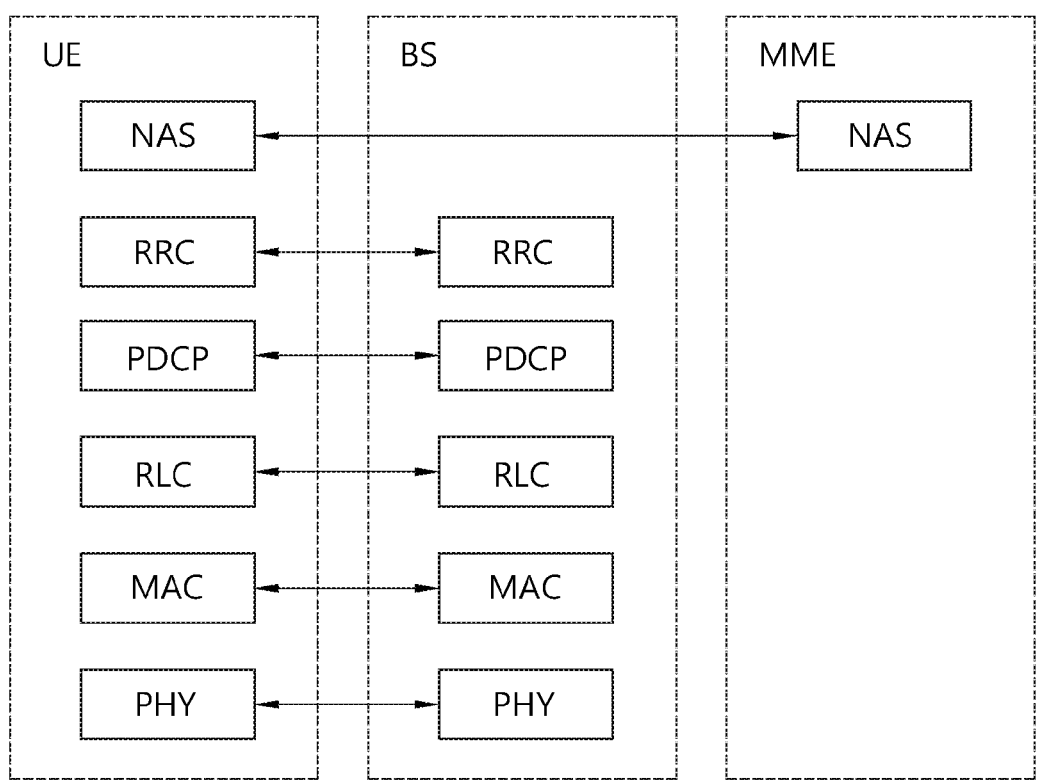
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
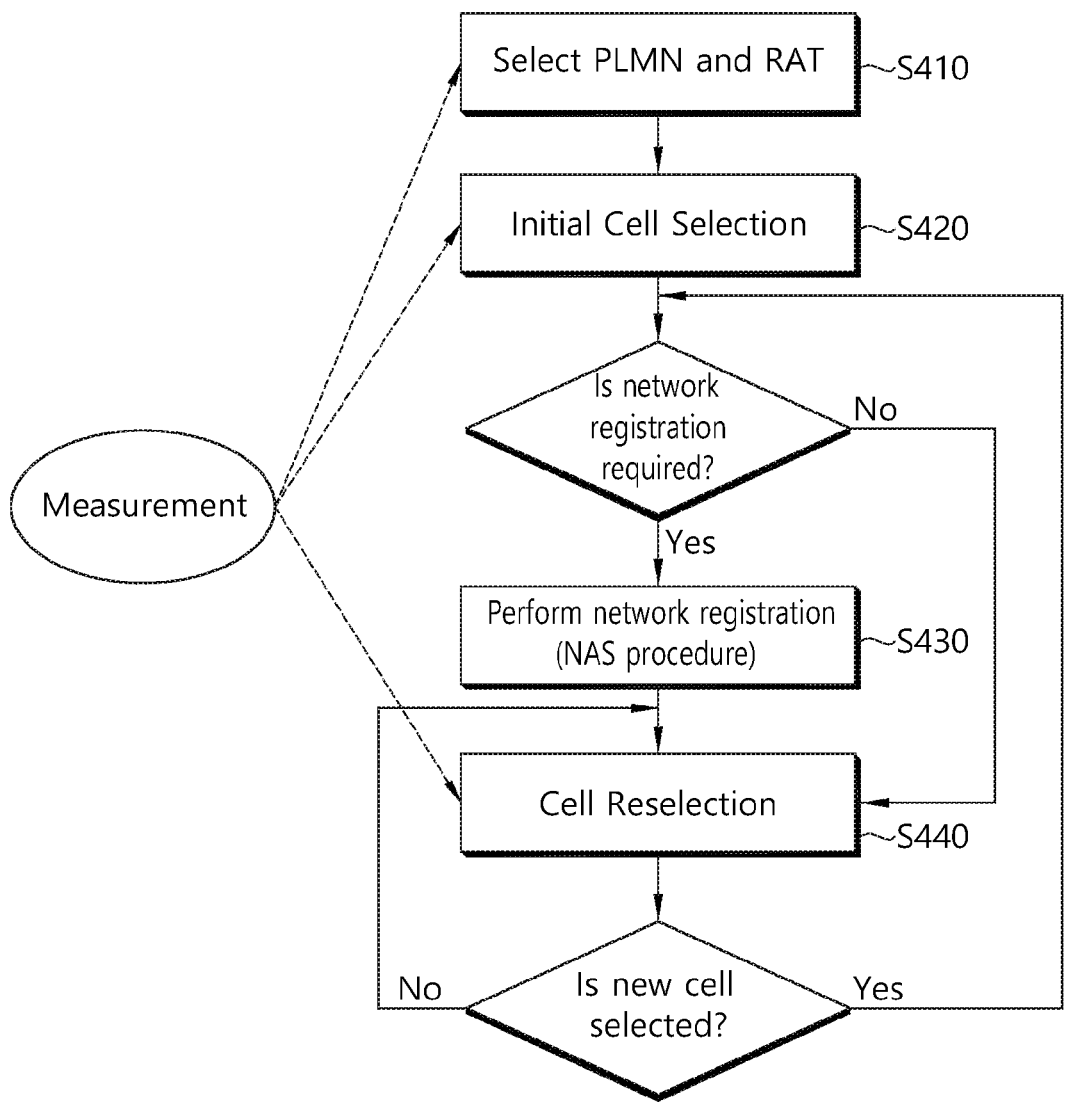
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
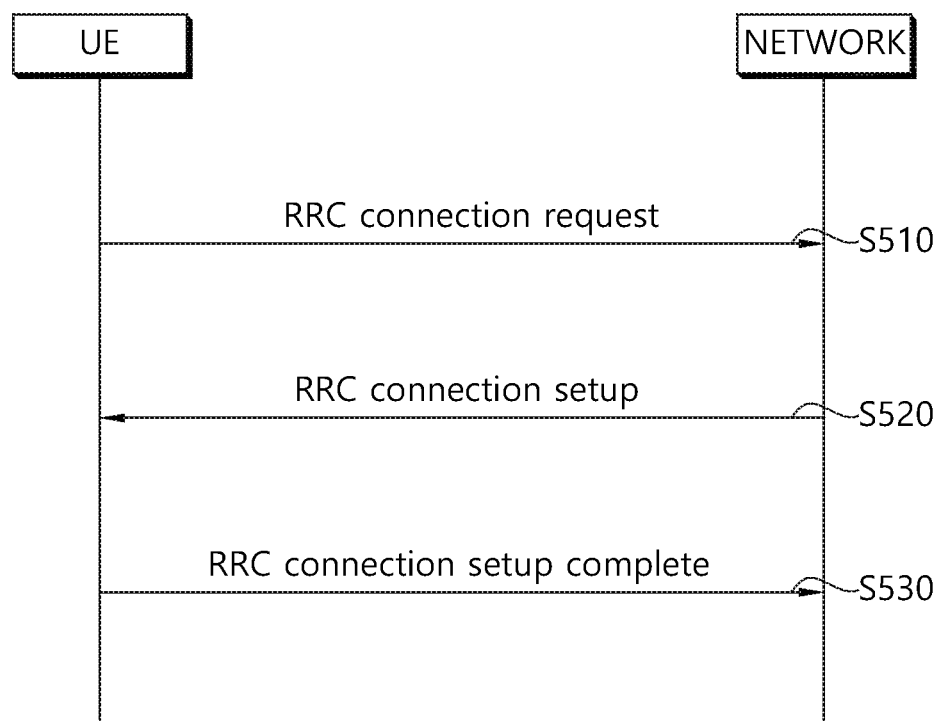
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
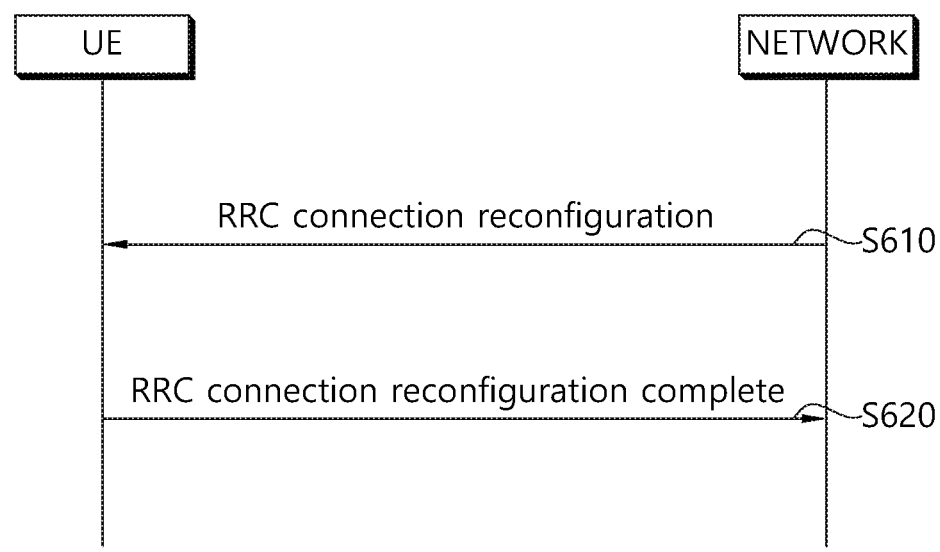
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

Srxlev>0 AND Spual>0 where:

$Srxlev = Q_{rxlevmeas} - (Q_{rxlevmin} + Q_{rxlevminoffset}) - P_{compensation}$ $Squal = Q_{qualmeas} - (Q_{qualmin} + Q_{qualminoffset})$ [Equation 1]

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$Rs = Q_{meas,s} + Q_{hyst}, Rn = Q_{meas,s} - Q_{offset}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
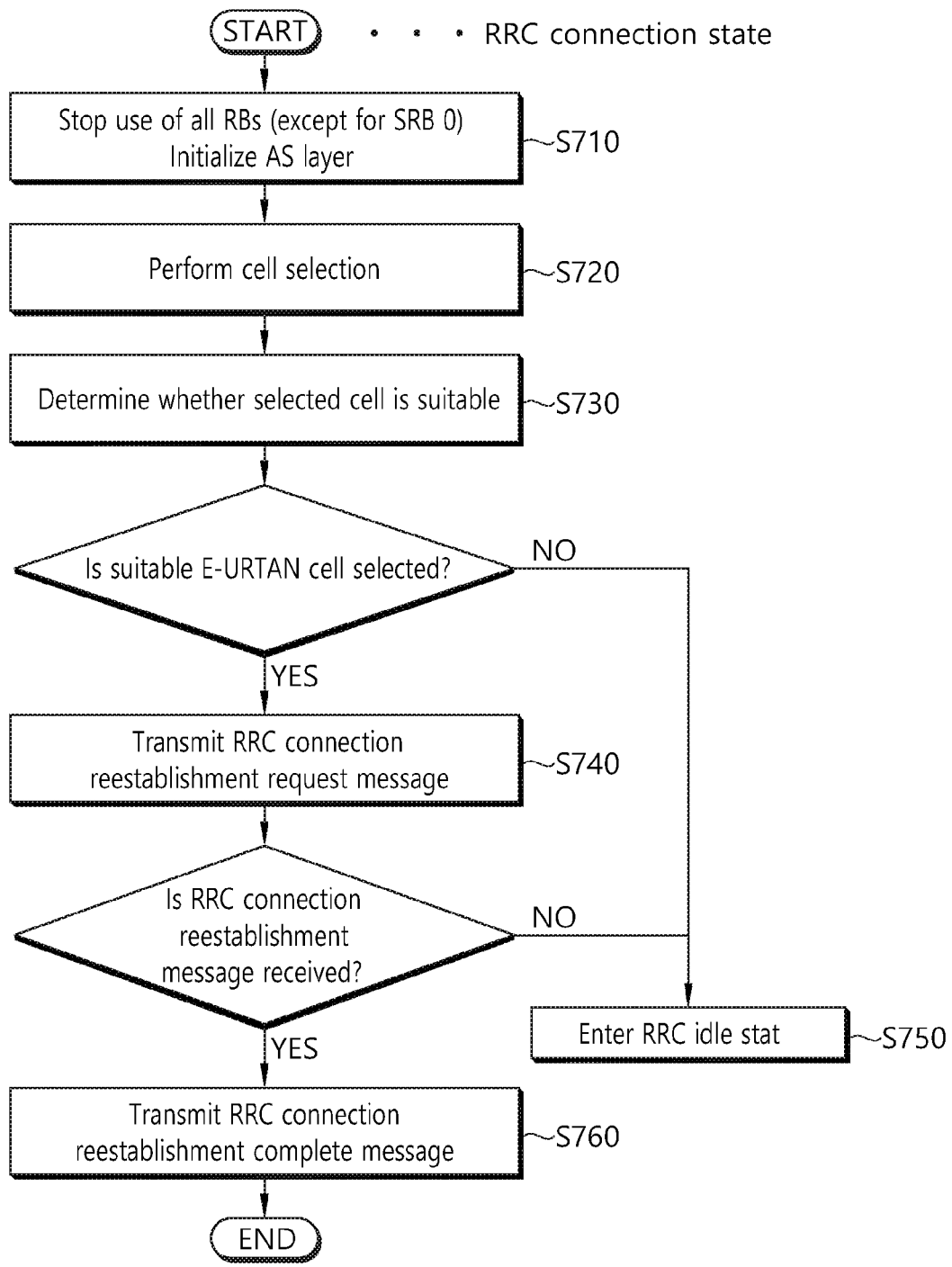
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
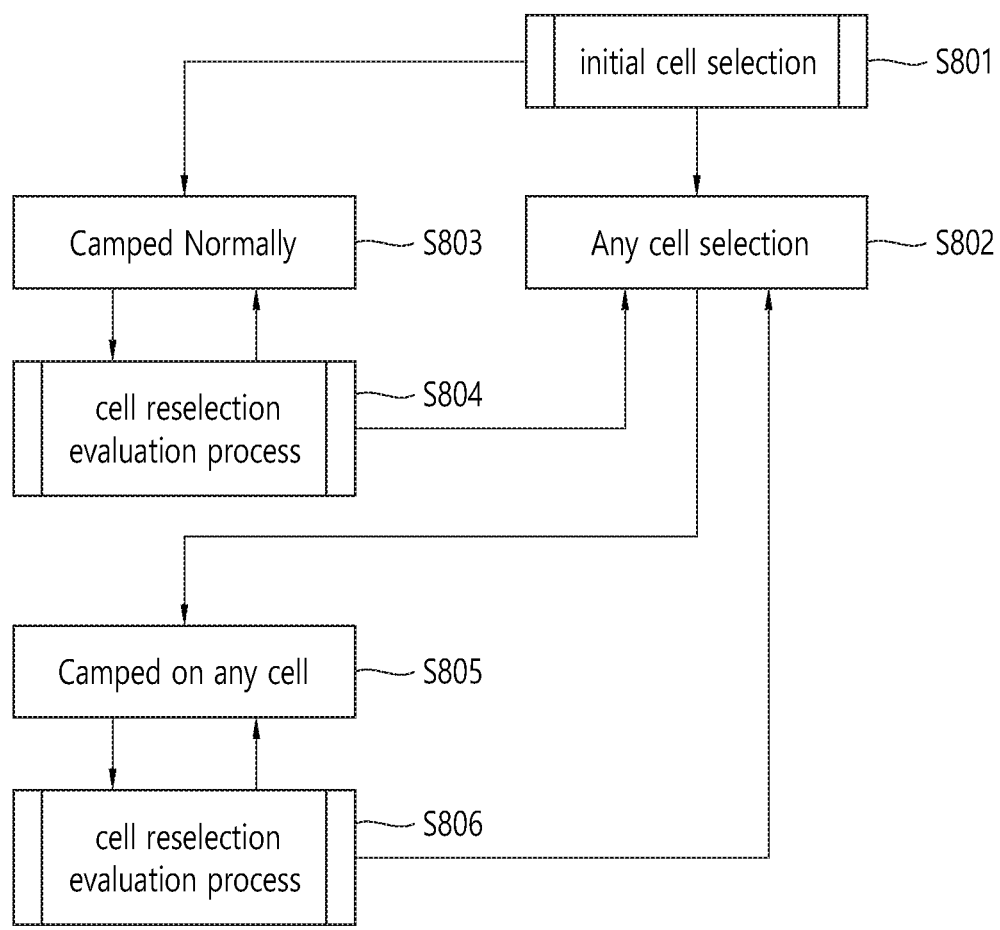
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
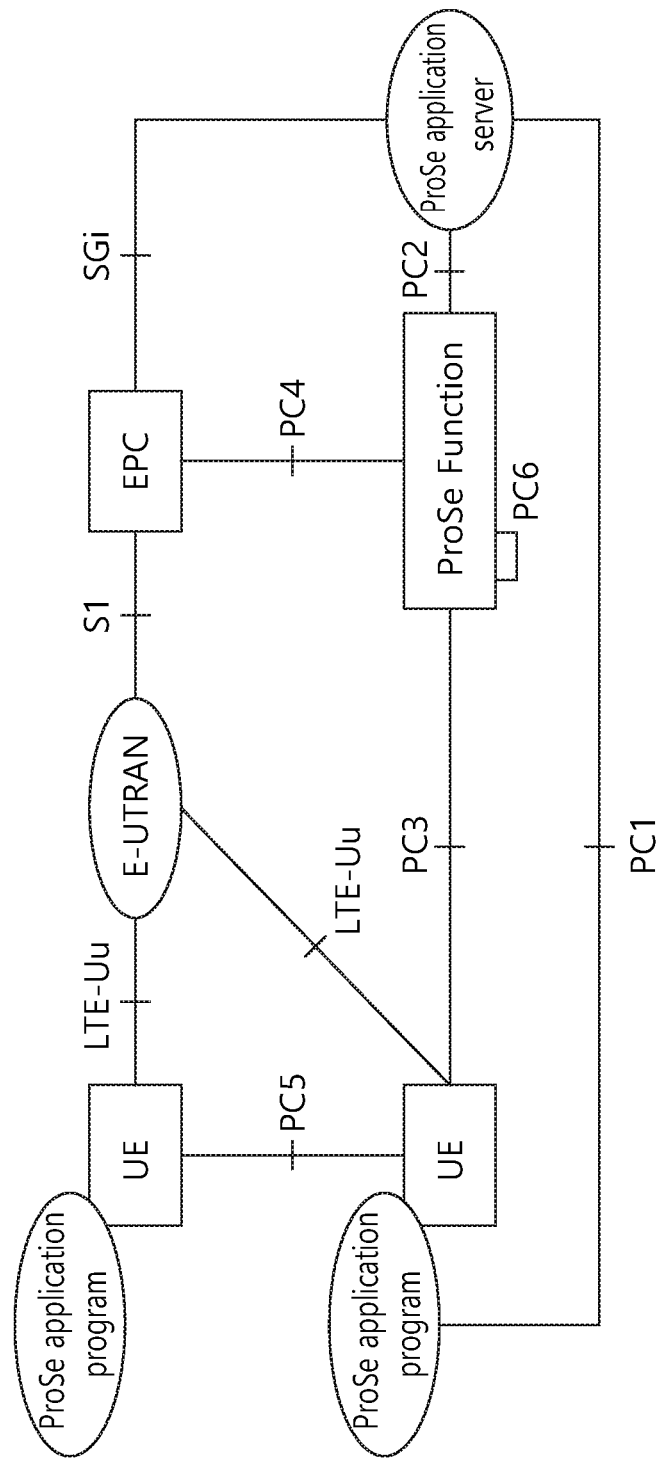
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
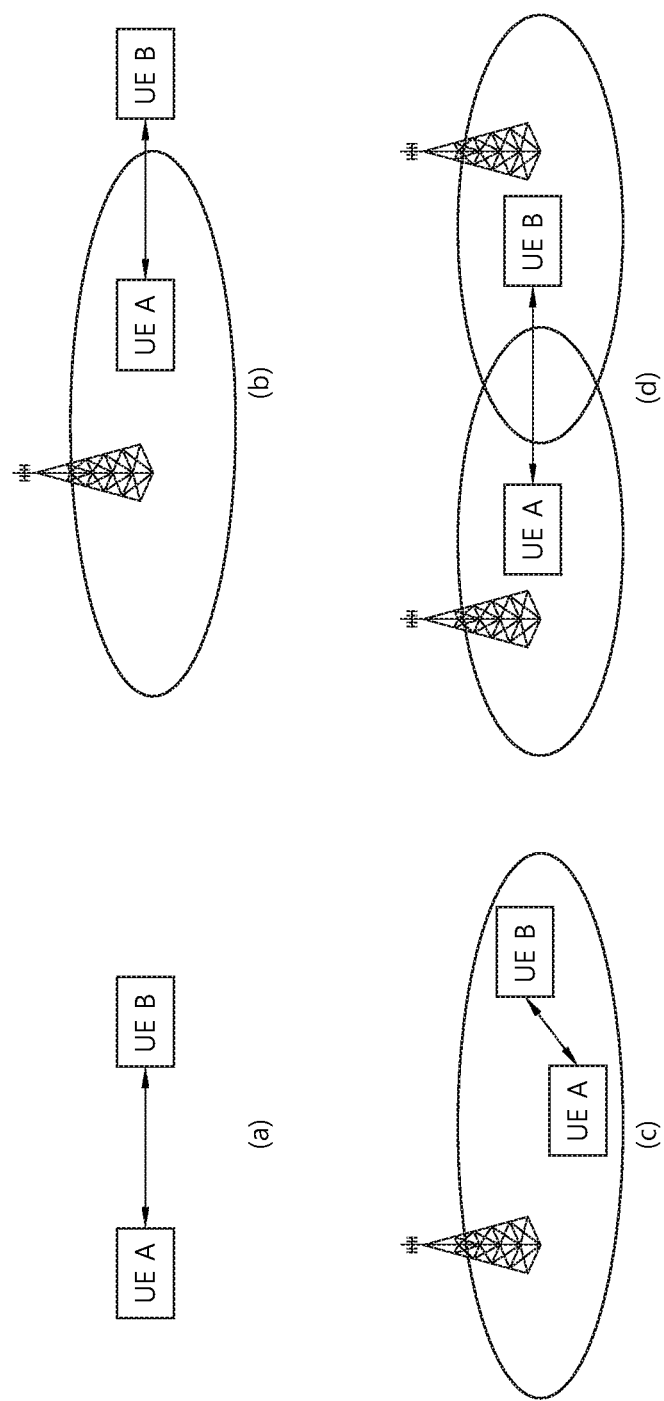
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
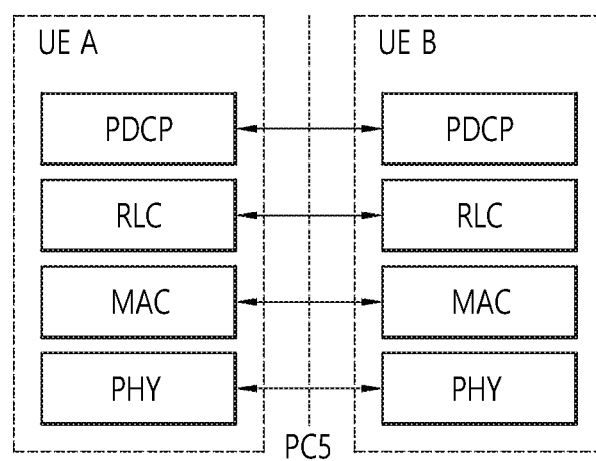
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
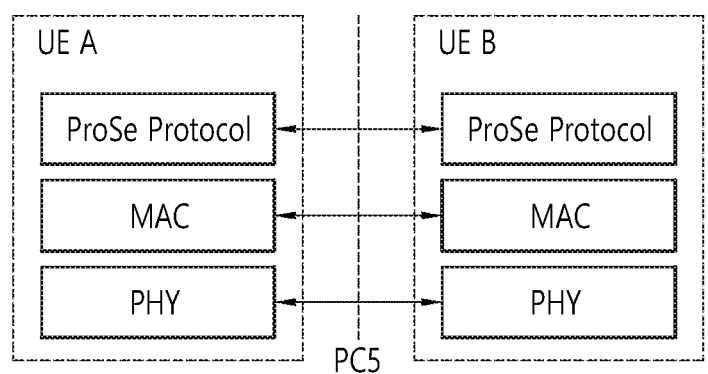
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
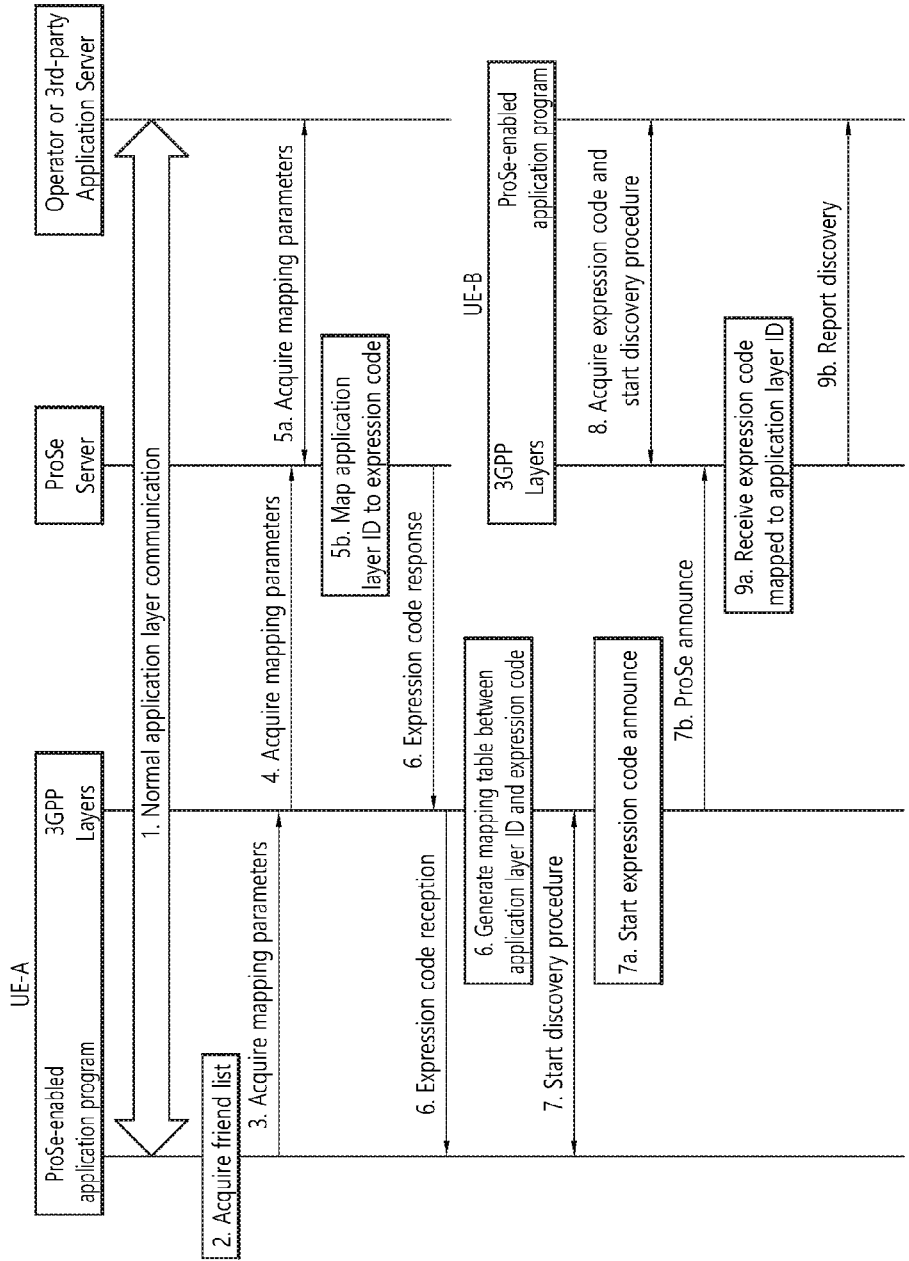
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
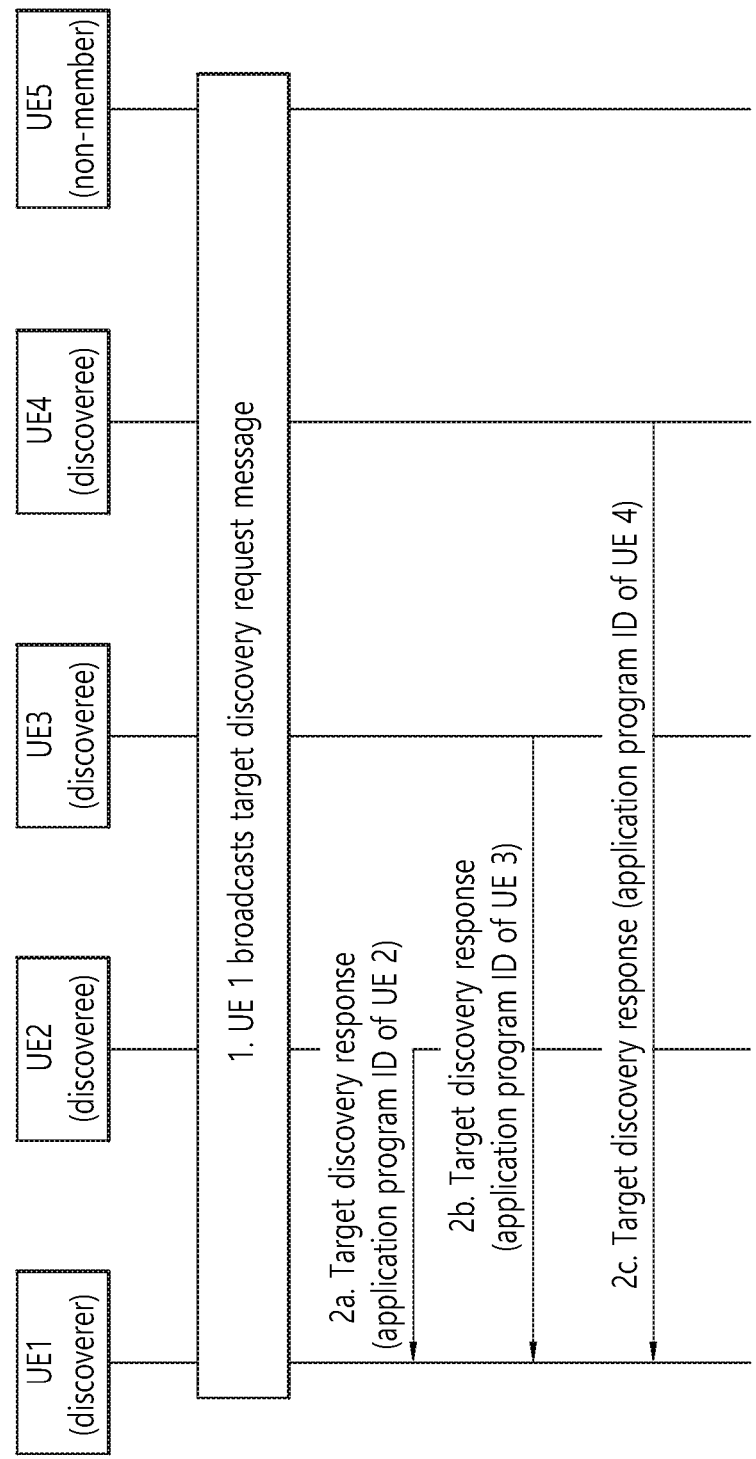
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

Meanwhile, the UE may provide a relay function or may discover a neighboring network node (refers to a relay node) which is previously provided. In this case, the network may not know presence of the relay node close to the UE. In this case, the network may inefficiently select a relay node. For example, although there is a relay node for providing a relay function around the UE, the network may unnecessarily instruct the UE to activate the relay function.

In addition, if other UEs close to the UE may identify presence of the relay node, this provides efficient communication to the other UEs.

For example, it is assumed that a UE 2 estimates communication delay with respect to a case of using a UE 1 as a relay node. If the UE 2 knows that a network node close to the UE 1 provides a relay function to the UE 1, the UE 2 may know that the UE 1 is a minimum 2 hop relay to exactly estimate communication delay.

In a following description, uplink means communication from the UE to a base station. The network node may represent a UE, a base station, and both of them. A configuration may means a rule determined by a network or previously determined in the UE.

In the present invention, the network, the network not may provide a relay function for another network node. In this case, the network node may signal that the network node provide a relay function. Moreover, the network node may signal that a specific resource allowed for only the relay function is used. As described above, the network node may be a UE. The UE providing the relay function may be classified into a UE-NW relay and a UE-UE relay according to whether to provide a relay function between certain network nodes.

Figure 15:
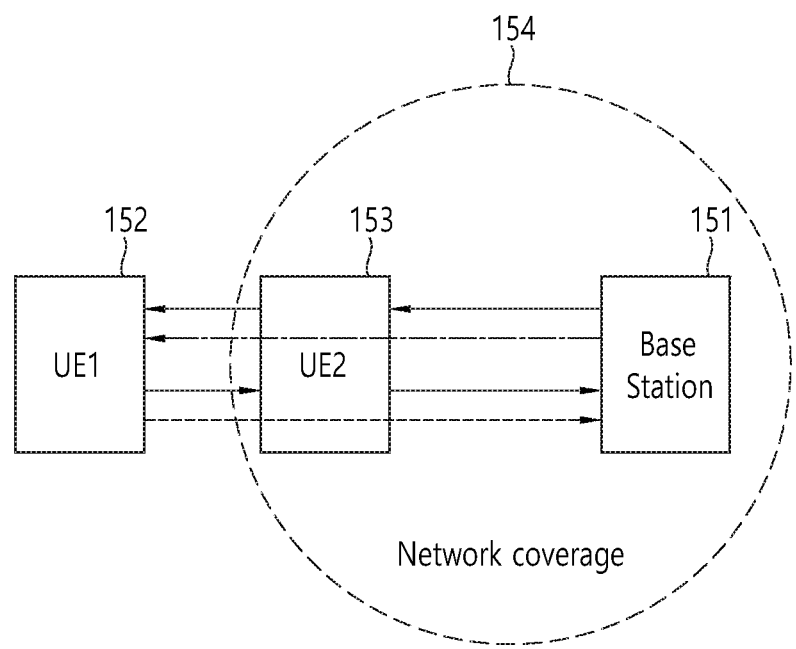
FIG. 15 illustrates a UE-NW relay.

FIG. 15 illustrates a UE-NW relay.

Referring to FIG. 15, a UE 2 153 serves as the UE-NW relay. That is, the UE 2 153 is a network node relaying between the network 151 and a UE 1 153 located outside the coverage 153 of the network 151. In this case, the UE 2 153 may serve as the UE-NE relay.

In FIG. 15, since the UE 1 152 is located outside the coverage of the network 151, if the UE 2 153 does not provide the relay function, the UE 1 152 may not communicate with the network 151.

Figure 16:
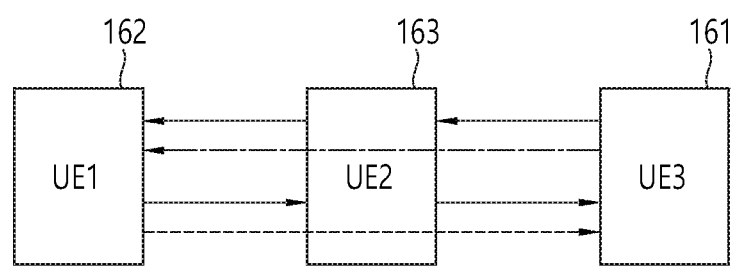
FIG. 16 illustrates a UE-UE relay.

FIG. 16 illustrates a UE-UE relay.

Referring to FIG. 16, a UE 2 163 serves as the UE-UE relay. That is, the UE 2 163 is a network node relaying between a specific UE 162 and another UE located outside the coverage of the specific UE 162. In this case, the UE 2 153 may serve as the UE-UE relay.

In FIG. 16, since UE 1 162 and UE 3 161 are located outside the coverage to each other, if the UE 2 163 does not provide the relay function, the UE 1 162 cannot communication with the UE 3 161.

Hereinafter, the present invention will be described.

Figure 17:
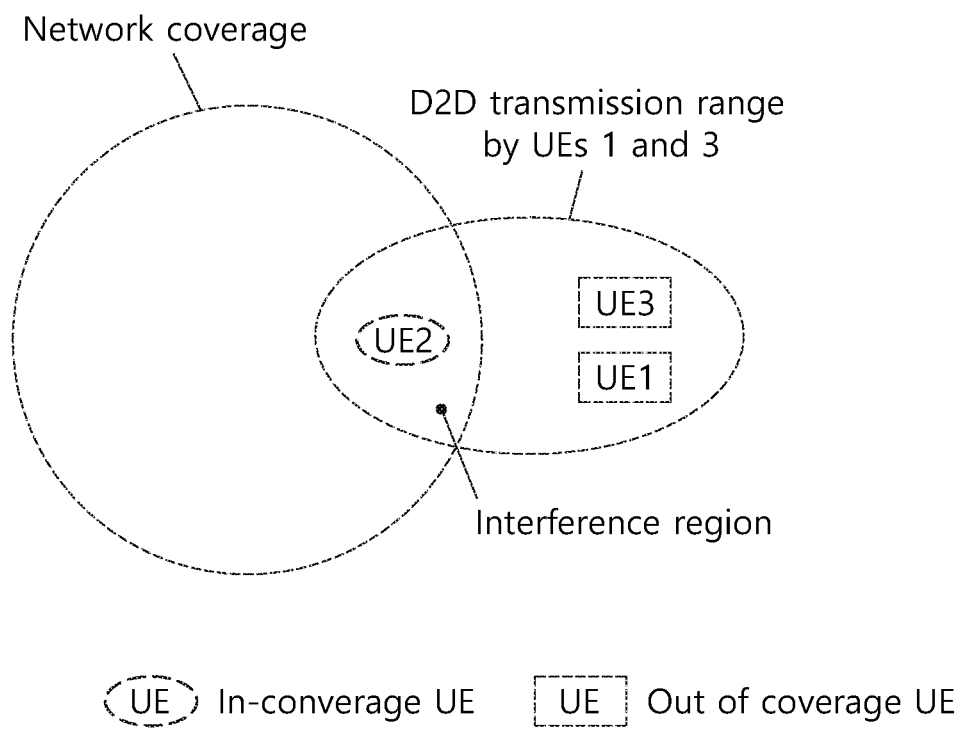
FIG. 17 illustrates network coverage and locations of UEs.

FIG. 17 illustrates network coverage and locations of UEs.

Referring to FIG. 17, it is assumed that UEs 1, 2, and 3 are moved after the UEs 1, 2, and 3 are located in the network coverage. As the moving result, it current UE 1 and UE 3 are located outside the network coverage, and the UE 2 is located in the network coverage.

In this case, a transmission range of the UE 1 (or UE 3) may partially overlap with the network coverage. Since interference may be generated in the overlapped part, the overlapped region refers to an interference region.

If it is detected that the UE 1 and the UE 3 is beyond the network coverage, a configuration (e.g., D2D configuration for D2D operation) applied to the network coverage is revoked by itself, a configuration applied outside the network coverage may be invoked. The configuration applied outside the network coverage may be reported to the UE 1 and the UE 3 or may be stored, and may be a configuration for the D2D operation.

That is, when the UE is separated from the network coverage, the UE may replace the D2D configuration provided from the network with another D2D configuration. In this case, another D2D configuration may be a configuration which is previously provided to the UE.

Hereinafter, for the convenience, it is assumed that the first D2D configuration is controlled by the network for the D2D operation, and the second D2D configuration is previously reported to the UE or is stored for the D2D operation. The second D2D configuration may be previously provided/stored to a subscriber identification module (SIM) or a memory of the UE or may be previous fixed or known by networks.

The following illustrates an example of a first D2D configuration.

TABLE 2

```
-- ASN1START
SystemInformationBlockType18-r12 ::= SEQUENCE {
    commConfig-r12                              SEQUENCE {
        commRxPool-r12                              ProseCommPoolList16-r12,
        commTxPoolNormalCommon-r12                  ProseCommPoolList4-r12
        OPTIONAL,  -- Need OR
        commTxPoolExceptional-r12                   ProseCommPoolList4-r12
        OPTIONAL,  -- Need OR
        commSyncConfig-r12
        ProseSyncConfigList16-r12    OPTIONAL    -- Need OR
    }
                                             OPTIONAL,  -- Need OR
    lateNonCriticalExtension         OCTET STRING
        OPTIONAL,
    ...
}
-- ASN1STOP
```

The first D2D configuration of the table 2 indicates a resource which may be used in ProSe direct communication. For example, the commRxPool'represents a resource allowed so that the UE receives ProSe direction communication. The 'commTxPoolNormalCommon' represents a resource allowed so that ProSe direct communication is transmitted in a RRC_Idle state. The 'commonTxPoolExceptional' represents a resource allowed so that ProSe direct communication is transmitted under an exceptional condition or an RRC connection establishment procedure in a RRC_connected state.

The following illustrates another example of the first D2D configuration.

TABLE 3

```
-- ASN1START
SystemInformationBlockType19-r12 ::= SEQUENCE {
    discConfig-r12                              SEQUENCE {
        discRxPool-r12                              ProseDiscPoolList16-r12,
        discTxPoolCommon-r12                        ProseDiscPooList4-r12
        OPTIONAL,  -- Need OR
        discTxPowerInfo-r12
        ProseDiscTxPowerInfoList-r12    OPTIONAL,    -- Need OR
        discSyncConfig-r12
        ProseSyncConfigList16-r12       OPTIONAL     -- Need OR
    }
                                             OPTIONAL,  -- Need OR
    discInterFreqList-r12                        ProseCarrierFreqInfoList-r12
        OPTIONAL,  -- Need OR
```

TABLE 3-continued

```
        lateNonCriticalExtension            OCTET STRING
            OPTIONAL,
        ...
}
ProseCarrierFreqInfoList-r12 ::= SEQUENCE (SIZE (1..maxFreq)) OF ProseCarrierFreqInfo-r12
ProseCarrierFreqInfo-r12::=          CHOICE{
        plmn-Index-r9                              INTEGER (1..maxPLMN-
r11),
        explicitValue-r9                           SEQUENCE {
            carrierFreq-r12                            ARFCN-ValueEUTRA-r9,
            plmn-Identity-r12                          PLMN-Identity
            OPTIONAL   -- Need OR
        }
}
-- ASN1STOP
```

Another example of the first D2D configuration of the table 3 represents a source which may be used in a ProSe direct Discovery. For example, the 'discTxPoolCommon' indicates a resource allowed to transmit a ProSe direction discovery announcement in a RRC_idle state. The 'discInterFreqList' indicates neighboring frequencies to which ProSe direct discovery announcement is supported.

Accordingly, when the UE is detected to be in the network coverage, the UE uses the first D2D configuration. When the UE is detected to be outside the network coverage, the UE uses the second D2D configuration. However, the above operation of the UE may cause a following problem.

1) Interference Between UE Groups

Figure 18:
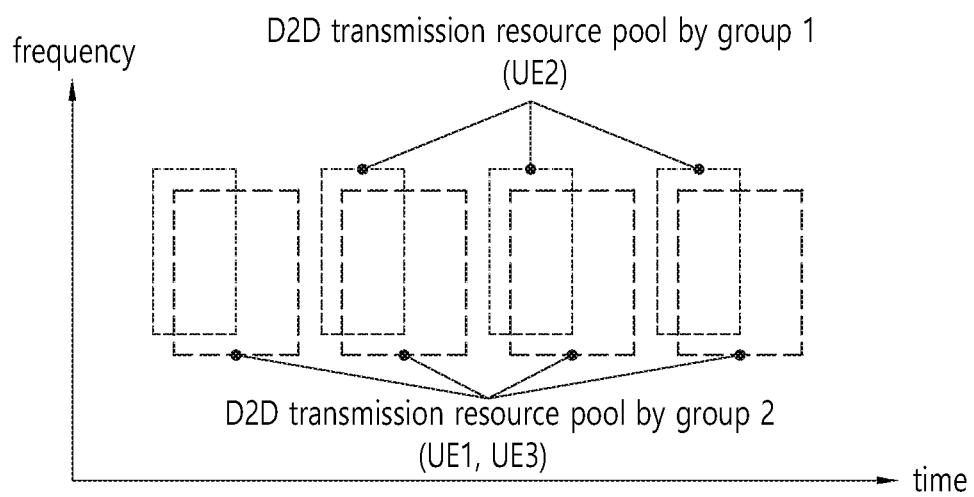
FIG. 18 illustrates an example where different UE groups use different D2D resource pools, respectively.

FIG. 18 illustrates an example where different UE groups use different D2D resource pools, respectively.

Referring to FIG. 18, a UE 2 may be included in a group 1, and a UE 1 and a UE 3 may be included in a group 2. A resource pool used by a group 1 to which the UE 2 belongs and a resource pool used by a group 2 to which the UE 1 and the UE 3 belong are partially overlapped with each other without complete separation. A resource pool used by the group 1 may be a resource pool according to the first D2D configuration provided by a network. A resource pool used by a group 2 may be a resource pool according to a second D2D configuration which is previously configured in the UE.

It is assumed that the UE 1 and the UE 3 are included in the same group and communicate with each other. Further, it is assumed that the UE 2 is included in another group. Further, if respective UEs are detected not to be served by a network (e.g., E-UTRANN) after applying a first D2D configuration in the network coverage (that is, the UEs are detected that the UEs are located outside the network coverage), it is assumed that the second D2D configuration is applied to the UE.

When the UE 1 and the UE 3 are separated from the network coverage, the UE 1 and the UE 3 will apply the second D2D configuration. Accordingly, the UE 1 and the UE 3 perform the D2D operation by applying the D2D resource based on the second D2D configuration. If the D2D resource overlaps with a D2D resource which is used in the network coverage, D2D operation between the UE 1 and the UE 3 outside the network coverage interferes with a D2D operation by a UE 2 in the network coverage, that is, transmission of a D2D signal of the UE 2.

2) Inefficient Communication in UE Group

It is assumed that the UE 1 and the UE 2 are included in the same group, and the D2D operation is performing in the network coverage. Next, only the UE 1 is moved outside the network coverage so that a resource according to the first D2D configuration is changed to a resource according to the second D2D configuration. Moreover, it is assumed that the UE 2 does not share the second D2D configuration.

In this case, as illustrated in FIG. 18, the resource according to the first D2D configuration is different from the resource according to the second D2D configuration so that there may be a different part. If the UE 1 transmits a D2D signal using the different part among the resource according to the second D2D configuration, the UE 2 cannot receive the above D2D signal. Accordingly, loss is caused in the D2D operation between the UE 1 and the UE 2. Since the D2D operation requires high reliability, the loss is not preferred.

Meanwhile, the example descries only a scenario when the UE moves to an outside from the network coverage. However, the above problem is not caused in the above case. That is, the same problem may be caused in a scenario where the UE moves to an inside from an outside of the network coverage.

For example, the UE 1 and the UE 2 perform the D2D operation using the D2D configuration (second D2D configuration) shared by each other outside of the network coverage and then only the UE 1 is moved into the network coverage to suddenly use the first D2D configuration. In this case, as a result, non-shared D2D configurations are used between the UE 1 and the UE 2. Accordingly, loss is caused in a D2D operation between the UE 1 and the UE 2.

As illustrated in the above example, when the UE is separated from or enters into the network coverage, if the D2D configuration is changed without controlling the resource, interference may be caused between different UE groups and loss of the D2D operation may be caused between UEs in the same group. Accordingly, there is a need for a D2D operation method and an apparatus thereof capable of solving the above problems.

So as to solve the above problem, the present invention may consider that allows a D2D resource in network coverage according to the first D2D configuration to be same as or to almost overlap with a D2D resource outside the network coverage according to the second D2D configuration. That is, the present invention may consider a method of coordinating D2D resource information used in the network coverage and D2D resource information used outside the network coverage.

The resource coordination method may include following two approaches.

1) Approach where a UE outside the network coverage depends on resource information in the network coverage 2) Approach where a UE in the network coverage depends on resource information outside the network coverage.

The second approach updates system information indicating the D2D resource by taking into consideration D2D resource information or provides dedicated signaling to the UE for updating the D2D resource information. Such an approach has a very great signaling overhead, the approach is not preferred. Accordingly, the first approach is preferred.

The easiest one of the first approach allows a UE in the coverage to provide D2D resource information thereof to a UE outside the coverage. In this case, the UE in the coverage may broadcast D2D resource information thereof. The D2D resource information may indicate resources of a time/frequency region which may be used in the D2D operation, and may include D2D transmission resources, D2D reception resources, and D2D synchronization resources. The D2D resource may be configured bug a resource pool being a group of individual resources.

If the UE outside the coverage receives resource information from the UE in the coverage, the terminal may depend on the D2D resource information received from the UE in the coverage instead of the above second D2D configuration. If the UE outside the coverage receive no D2D resource information from the UE in the coverage, the terminal may use the second D2D configuration.

Figure 19:
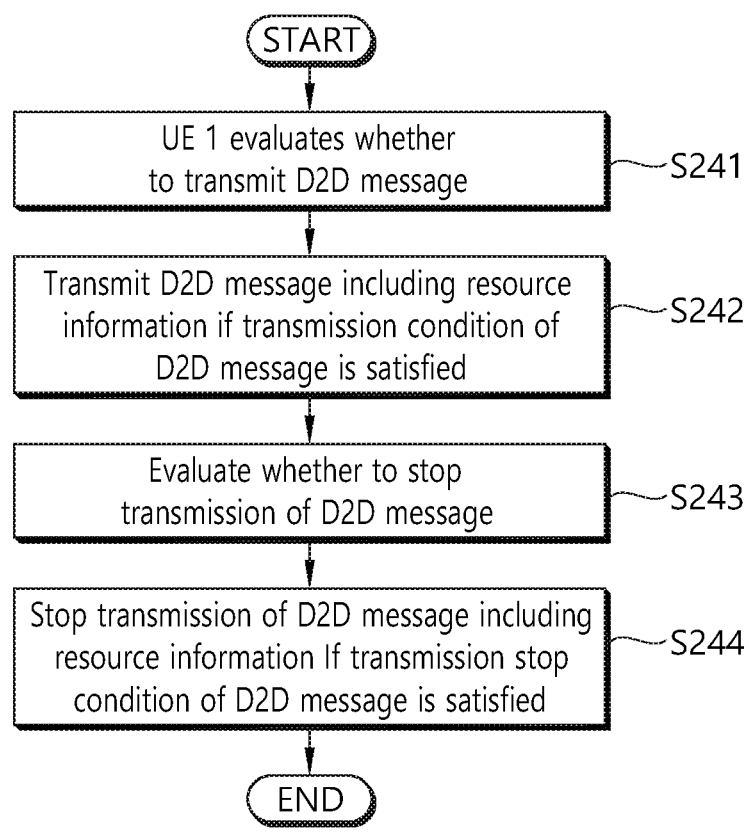
FIG. 19 illustrates a D2D operation method according to an embodiment of the present invention.

FIG. 19 illustrates a D2D operation method according to an embodiment of the present invention.

Referring to FIG. 19, a UE 1 located in the network coverage (hereinafter referred to as 'coverage') may evaluate whether to transmit a D2D message (S241).

The D2D message may include resource information indicated from the network in order to report a resource to be used for the D2D operation to another UE in the network coverage. Evaluation whether to transmit the D2D message may be performed by determining whether a transmission condition of the D2D message is satisfied.

If the transmission condition of the D2D message is satisfied, the UE 1 transmits a D2D message including the resource information (S242). The message may include information indicating that the resource information is a resource used in the network coverage. The UE 1 may transmit the D2D message for the UE 2 located outside the network coverage.

The UE 1 evaluates whether to stop transmission of the D2D message (S243).

Evaluation to stop transmission of the D2D message may be performed by determining whether a transmission stop condition of the D2D message is satisfied.

If the transmission stop condition of the D2D message is satisfied, the UE 1 stops transmission of the D2D message including the resource information (S244).

Hereinafter, respective steps of FIG. 19 will be described in detail.

First, the resource information may indicate resources of the time/frequency region which may be used in the D2D operation in the network coverage. The resource information may be transmitted while being included in the D2D message.

When evaluating whether to transmit the D2D message, the UE 1 may evaluate based on which to satisfy the transmission condition of the D2D message.

The transmission of the D2D message may include one of a plurality of conditions. The plurality of conditions is as follows.

TABLE 4

| Transmission condition | Description |
|---|---|
| T_C1 | Detect that there is at least one UE outside network coverage |
| T_C2 | Detect that resource information indicated by a network is updated. |
| T_C3 | Detect that there is at least one UE having no updated resource information |

Meanwhile, the transmission condition of the D2D message may be one of conditions listed in the table, and may be configured by a combination of the above conditions.

For example, the transmission condition of the D2D message may be a combination of the $T_{13}$ C1 and the T_C3. That is, when the UE 1 detects that the UE 2 is located outside the network coverage, only if it is detected that the UE 2 have no updated resource information, the transmission condition of the D2D message is satisfied.

If the transmission condition of the D2D message is satisfied, the UE 1 may broadcast the D2D message. In this case, the D2D message may not include an ID with respect to a specific UE.

Alternatively, if the transmission condition of the D2D message is satisfied, the UE 1 may broadcast or multicast the D2D message. In this case, the D2D message include a group ID indication a reception subject or an internet protocol (IP) of a reception subject.

The D2D message may be transferred using a transmission mechanism of the above D2D discovery signal. Alternatively, the D2D message may be transferred through a transmission mechanism of the above D2D communication.

Further, the D2D message may include information indicating a version of resource information. The information indicating the version of the resource information may have the same value as a version of system information transmitted from the network.

Alternatively, the information indicating the version of the resource information may indicate a value for only the resource information separately from the system information. For example, the information indicating the version of the resource information is increased one by one each time the resource information is updated. Accordingly, when the system information including the resource information is updated, the information indicating the version of the resource information is also increased one by one. However, when the system information having no resource information is updated, the information indicating the version of the resource information is not increased.

Evaluation whether to stop transmission of a D2D message may be performed by determining whether a transmission stop condition of the D2D message is satisfied.

The transmission stop condition of the D2D message may be to satisfy the transmission condition of the D2D message no longer. That is, without satisfying a separate condition for a transmission stop of the D2D message, the transmission condition of the D2D message is satisfied and the transmission of the D2D message stops when the transmission condition of the D2D message is not satisfied.

Figure 20:
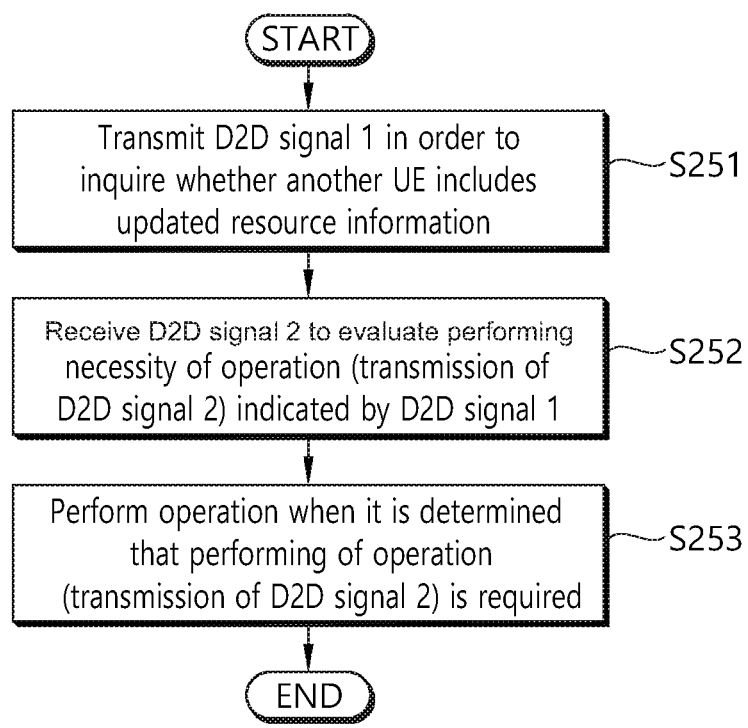
FIG. 20 illustrates a method of detecting that there is another UE having no updated resource information.
Figure 21:
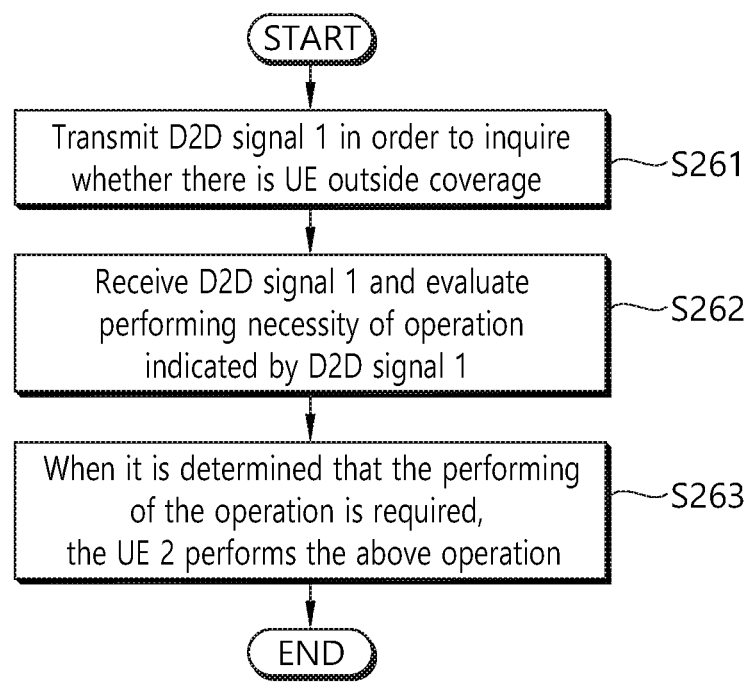
FIG. 21 illustrates a method of detecting other UEs outside the coverage by the UE.

As described above, the D2D message may be transmitted if the transmission condition of the table 4 is satisfied. The following is a description regarding how to identity whether the UE in the network coverage satisfies the transmission. FIG. 20 illustrates a method of detecting whether a T_C2 is satisfied and FIG. 21 illustrates a method of detecting whether a T_C1 is satisfied.

FIG. 20 illustrates a method of detecting that there is another UE having no updated resource information. It is assumed in FIG. 20 that the UE 1 is an UE in coverage.

Referring to FIG. 20, a UE transmits a D2D signal 1 in order to inquire whether another UE includes updated resource information (S251). That is, the UE 1 may inquire whether another UE includes the updated resource information by transmitting the D2D signal 1 to anther UE.

The D2D signal 1 may include all or a part of fields listed in a following table 5.

TABLE 5

| Fields | Description |
| --- | --- |
| Group ID or UE ID | ID indicating a reception subject of a D2D signal 1 |
| Condition | Condition to be evaluated by UE receiving a D2D signal |
| Operation | Operation to be performed when a condition is satisfied |
| Version | Indicates a version of resource information |
| ID of D2D signal | Indicates an ID of a D2D signal as a randomly determined number |

Referring to the table 5, the D2D signal 1 may include at least one group ID indicating a reception subject.

An ID indicating the reception subject may include a group ID or a UE ID. The group ID and the UE ID may sequentially indicate a UE group or a UE which will receive the D2D signal.

In addition, the D2D signal 1 may include a condition to be evaluated by another UE (e.g., UE 2) and information indicating an operation to be performed by another UE (e.g., UE 2) when the condition is satisfied. That is, the D2D signal 1 may indicate a condition used to determine whether the UE 2 performs the above operation. When the condition is satisfied, the D2D signal 1 may report an operation to be performed by the UE 2. That is, the D2D signal 1 may request a specific operation to the UE 2 under a predetermined condition.

The above condition may be one of following contents.
1) UE (UE 2) does not include updated resource information.
2) UE (UE 2) includes the updated resource information.

The D2D signal 1 may separately indicate an operation to be performed by the UE 2 and performing conditions of the operation. That is, the operation and the condition may be separately indicated. For example, a D2D signal indicating the operation and a D2D signal indicating the performing conditions of the operation may be provided, respectively. Alternatively, the operation and the conditions may be indicated according to a field indicating the operation in the same D2D signal and a field indicating the performing conditions of the operation.

Alternatively, the operation and the conditions may be indicted in a combined form. That is, the operation and the performing conditions may be through a value of a single field of the D2D signal.

Further, the D2D signal 1 may include information indicating a version of resource information. The information indicating the version of the resource information may be used to determine whether the UE 2 include updated resource information.

In addition, an optional number may be indicated in a specific field of the D2D signal. The optional number may be used as an ID of the D2D signal.

Meanwhile, the D2D signal 1 may request a specific operation to a UE receiving the signal. For example, when the UE 1 transmits the D2D signal 1 to the UE 2, the D2D signal 1 may request to the UE 2 to transmit a response signal (refers to a D2D signal 2).

The UE 2 receives the D2D signal to evaluate performing necessity of the operation indicated by the D2D signal 1 (S252). As described above, the D2D signal 1 may include at least one of a requesting operation with respect to the U2, performing conditions of the operation, an ID of a reception subject, and an ID of the D2D signal.

When it is determined that the performing of the requesting operation UE 2 is required, the UE 2 performs the operation (S253).

If the UE 2 receives the D2D signal 1 including a group ID as an ID indicating a reception subject, only when a group ID of the UE 2 is the same as or corresponds to a group ID included in the D2D signal 1, the D2D signal 1 may be efficient with respect to the UE 2.

If the group ID of the UE 2 is different from a group ID included in the D2D signal 1, the D2D signal 1 is not valid with respect to the UE 2. Accordingly, the UE 2 disregards the D2D signal 1 not to perform an operation indicated by the D2D signal 1.

Alternatively, if the UE 2 receives the D2D signal 1 including a UE ID as an ID indicating a reception subject, only when an ID of the UE 2 is the same as a UE ID indicating the reception subject, the D2D signal 1 is valid with respect to the UE 2.

If the UE 2 receives a D2D signal 1 having no a group ID indicating the reception subject or a UE ID, the UE 2 may perform an operation requested by the D2D signal 1 regardless of the group ID of the UE 2 or an ID of the UE 2.

Meanwhile, the D2D signal 1 includes information indicating a version of resource information, the UE 2 receiving the D2D signal 1 compares the version of the resource information with a stored version of the resource information. Accordingly, the UE 2 may determine whether the UE 2 includes updated resource information.

If the D2D signal 1 includes a condition, the UE 2 may perform an operation requested according to the D2D signal 1 only when the condition is satisfied. In order to increase certainty, a step of determining whether the condition is satisfied may be performed a plurality of times. The operation may be an operation of transmitting a response (D2D signal 2) with respect to the received D2D signal 1.

In this case, the D2D signal may include at least one of fields indicating following information.

TABLE 6

| Fields | Description |
| --- | --- |
| UE ID | UE ID indicating a transmission subject of a D2D signal 2 |
| Group ID | ID of a group in which a UE transmitting the D2D signal 2 is included |
| Transmission conditions | An ID of a satisfied transmission condition may be included as a field indicating the satisfied transmission condition among transmission conditions of the D2D signal 2. An ID of a transmission condition in the D2D signal 2 may be the same as the ID of a transmission condition in the D2D signal 1. |
| Random number | The random number is a field for indicating an ID of the D2D signal 2. A randomly generated number may be included. |

The above table will be described.
1) UE ID: The information indicates who transmits the D2D signal 2 to a UE (e.g., UE 1) receiving the D2D signal 2.
2) Group ID: The information indicates a group of UEs transmitting the D2D signal 2.

3) Transmission conditions: The information indicates that the UE transmits the D2D signal 2 by satisfying a certain condition.

4) Random number: The information may indicate which a response of the D2D signal 1 is the D2D signal 2. For example, when an optional number X is included in the D2D signal 1, a D2D signal 2 transmitted as a response with respect to the D2D signal 1 includes the optional number X. Accordingly, the UE may determine whether the response is suitable. Meanwhile, the optional number is not always one number but may be a function of a plurality of parameters. The function may be shared in UEs included in the same group. The UEs in the same group may be commonly used as input of the function by sharing one of the plurality of parameters.

FIG. 21 illustrates a method of detecting other UEs outside the coverage by the UE.

It is assumed that the UE 1 is a UE in the coverage.

Referring to FIG. 21, the UE 1 transmits the D2D signal 1 in order to inquire whether there is UE outside the coverage (S261).

The D2D signal 1 may include conditions to be evaluated by the UE 2 based on the network coverage in another UE (e.g., UE 2) and information indicating an operation to be performed by the UE 2 when the conditions are satisfied.

That is, the D2D signal may include conditions used to determine whether the UE 2 performs the operation. If the conditions are satisfied, the UE 2 may perform an operation indicated by the D2D signal 1.

The conditions may be one condition or a combination of two or more conditions.

1) UE (hereinafter referred to as 'UE 2') is located outside a network coverage.

2) UE is located in the network coverage.

3) The UE is not served by an E-UTRA.

4) UE is served by the E-UTRA.

5) UE discovers no synchronization signals transmitted from a network.

6) UE can discover no D2D synchronization signals.

7) UE discovers no UEs for providing a relay function.

A case where the UE is located outside the network may be one of following states.

1) UE is not served from a certain network (that is, the UE does not select a suitable cell to be camped on or an acceptable cell with respect to a certain RAT), and 2) UE is not served by an E-UTRA (that is, the E-UTRA does not select a suitable cell to be camped on or an acceptable cell with respect to a certain RAT).

The D2D signal 1 may separately indicate a requesting operation and performing conditions of the operation. That is, the requesting operation and performing conditions of the operation may be separately indicated. For example, a D2D signal indicating the requesting operation and a D2D signal indicating the performing conditions of the operation may be provided, respectively. Alternatively, the requesting operation and performing conditions of the operation may be indicated according to a field indicating the requesting operation in the same D2D signal and a field indicating the performing conditions of the requesting operation.

Alternatively, the requesting operation and performing conditions of the operation may be indicated in a combined form. That is, the requesting operation and performing conditions of the operation may be indicated through a value of a single field of the D2D signal.

An optional number may be indicated in a specific field of the D2D signal. The optional number may be used as an ID of the D2D signal.

Further, the D2D signal 1 may include information indicating a UE which will transmit the D2D signal 2 as a response thereof. That is, the D2D signal 1 may include an ID indicting a reception subject. The D2D signal 1 may include at least one of a group ID and a UE ID. The group ID and the UE ID may indicate a UE group or a UE which will the D2D signal.

Alternatively, the D2D signal 1 does not indicate a specific UE and may indicate to transmit the D2D signal 2 as a response if a certain UE receives the D2D signal.

The D2D signal 1 may indicate an operation for requesting the D2D signal to the UE. For example, when the UE 1 transmits the D2D signal to the UE 2, the D2D signal 1 may request the UE 2 to transmit a response signal.

The D2D signal 1 may include information indicating whether a UE transmitting the D2D signal is located inside or outside the network coverage.

Meanwhile, various signals may be used as the D2D signal 1. For example, a D2D discovery signal/message may be used as the D2D signal 1. Alternatively, the D2D communication message may be used as the D2D signal 1.

Alternatively, the D2D synchronization signal may be used as the D2D signal 1. For example, the UE 1 may transmit a synchronization signal as the D2D signal 1. The UE 2 receiving the synchronization signal may transmit the D2D signal 2 as a response. In this case, the UE 2 may adjust synchronization using the synchronization signal. The UE 1 may transmit the synchronization signal only at a predetermined period.

UE 2 receives the D2D signal 1 and then evaluates performing necessity of an operation indicated by the D2D signal 1 (S262). As described above, the D2D signal 1 may include at least one of an operation requesting with respect to the UE 2, the performing conditions of the operation, an ID of a reception subject, and an ID of the D2D signal 1.

When it is determined that the performing of the requesting operation is required, the UE 2 performs the above operation (S263).

If the UE 2 receives the D2D signal 1 including a group ID as a reception subject, only when a group ID of the UE 2 is the same as or corresponds to a group ID included in the D2D signal 1, the D2D signal 1 may be valid with respect to the UE 2.

If the group ID of the UE 2 is different from the group ID included in the D2D signal 1, the D2D signal 1 is not valid with respect to the UE 2. Accordingly, the U2 disregards the D2D signal 1 and does not perform an operation indicated according to the D2D signal 1.

Alternatively, if the UE 2 receives a D2D signal 1 including a UE ID as an ID indicating a reception subject, only when an ID of the UE 2 is the same as a UE ID indicating the reception subject, the D2D signal 1 is valid in the UE 2.

If the UE 2 receives the D2D signal 1 which does not include a group ID or UE ID indicating a reception subject, the UE 2 may perform an operation requested according to the D2D signal 1 regardless of a group ID of the UE 2 or an ID of the UE 2.

Meanwhile, if the D2D signal 1 includes the conditions, only when the conditions are satisfied, the UE 2 may perform an operation requested according to the D2D signal 1.

If the above condition is that 'UE (hereinafter referred to as 'UE 2') is located outside the network coverage', the condition may mean that the UE does not discover event one of a camp-on suitable cell or an acceptable cell. Moreover, in an NAS layer of the UE, the UE may correspond to a 'EMM-REGISTERED.NO-CELL-AVAILABLE' state or 'EMM-DEREGISTERED.NO-CELL-AVAILABLE' state. Alternatively, the condition may correspond to a case where the UE does not discover any cells satisfying the equation 1.

If the condition is that the UE is not served by the E-UTRA, the condition may signify that the UE does not discover event one of a camp-on suitable cell or an acceptable cell.

If the condition is the UE is located outside the network coverage, the condition may mean that the UE does not discover event one of a camp-on suitable cell or an acceptable cell.

If one of the above conditions is satisfied, the UE 2 determines that there is a need for an operation requested according to the D2D signal 1 to perform the operation. For example, the operation may be to transmit a response with respect to the received D2D signal 1. In this case, the response may refer to a D2D signal 1, and may include at least one of following information.

1) UE ID of UE 2: The information indicates who transmits the D2D signal 2 to a UE (e.g., UE 1) receiving the D2D signal 2.

2) Group ID of UE 2: The information indicates a group of UEs transmitting the D2D signal 2.

3) Condition indicated by the D2D signal 1: The information indicates that the UE transmits the D2D signal 2 by satisfying a certain condition.

4) Optional number indicated according to the D2D signal 1: The information may indicate which a response of the D2D signal 1 is the D2D signal 2. For example, when an optional number X is included in the D2D signal 1, a D2D signal 2 transmitted as a response with respect to the D2D signal 1 includes the optional number X. Accordingly, the UE may determine whether the response is suitable. Meanwhile, the optional number is not always one number but may be a function of a plurality of parameters. The function may be shared in UEs included in the same group. The UEs in the same group may be commonly used as input of the function by sharing one of a plurality of parameters.

Figure 22:
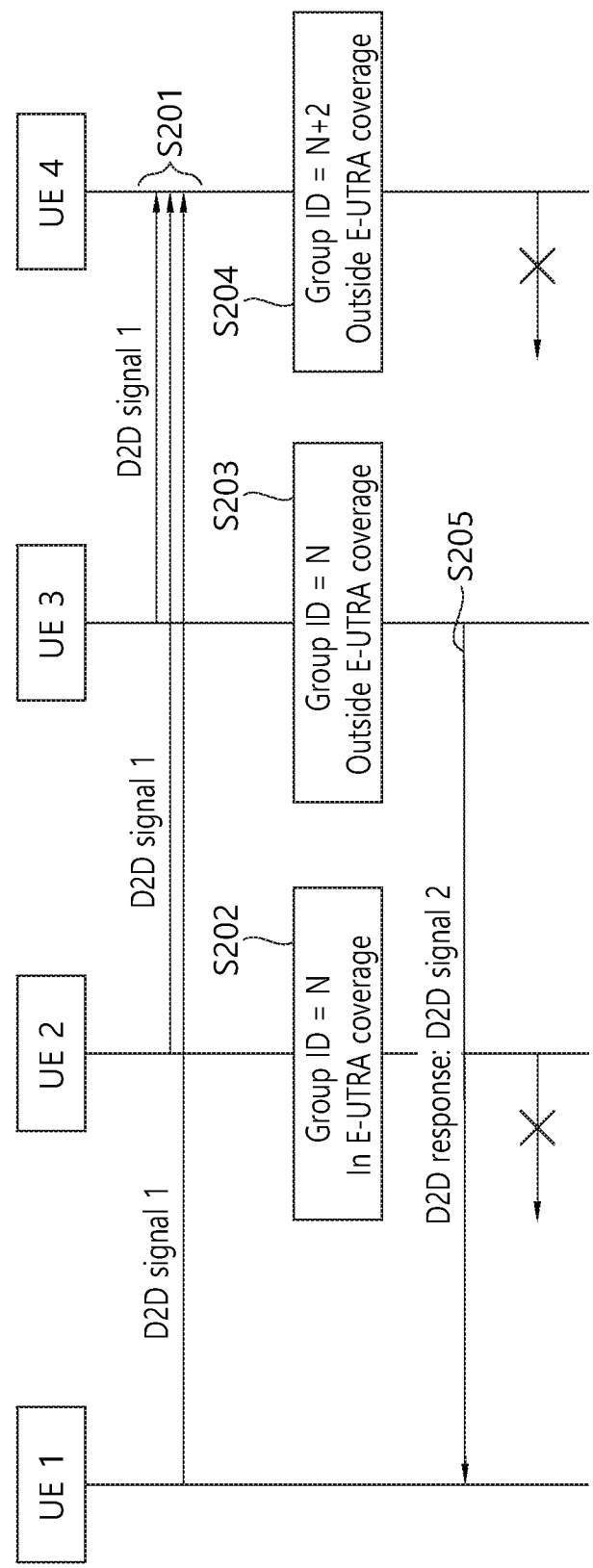
FIG. 22 illustrates a method of detecting another UE located outside the network coverage by the UE.

FIG. 22 illustrates a method of detecting another UE located outside the network coverage by the UE.

Referring to FIG. 22, a UE 1 broadcasts a D2D discovery signal (S201). That is, step S201 is a case where the D2D discovery signal is used as a D2D signal 1. UEs 2, 3, and 4 receive the broadcasted D2D signal 1.

The D2D discovery signal may include a group ID indicating a reception subject, information indicating a requesting operation, information indicating performing conditions of the operation, and an ID with respect to the D2D discovery signal.

For example, the D2D discovery signal has N as a group ID indicating a reception subject, information indicting the requesting operation may be given as a D2D response request (that is, transmission request of the D2D signal), information indicating the performing conditions of the operation may be given as 'coverage of an E-UTRA is separated', and an ID with respect to the D2D discovery signal may be given as an optional number M.

If the UE 2 is located in an E-UTRA and the group ID is N (S202), the performing conditions are not satisfied.

Accordingly, the UE 2 does not transmit a D2D response to the UE 1. If the UE 3 is located outside the E-UTRA coverage, and a group ID is N (S203), the UE 3 satisfies the performing conditions. Accordingly, the UE 2 transmits a D2D response (D2D signal 2) to the UE 1 (S205). In this case, in order to identify which response of the D2D signal 1 is the D2D response, the UE 2 may transmit the D2D signal 1 while including an ID of the D2D signal 1. That is, in the above example, the D2D response includes a number M which is an ID with respect to the D2D discovery signal.

If the UE 4 is located outside the E-UTRA coverage, and a group ID is N+2 (S204), the UE 4 does not satisfy the performing conditions. Accordingly, the UE 4 does not transmit a D2D response to the UE 1.

Figure 23:
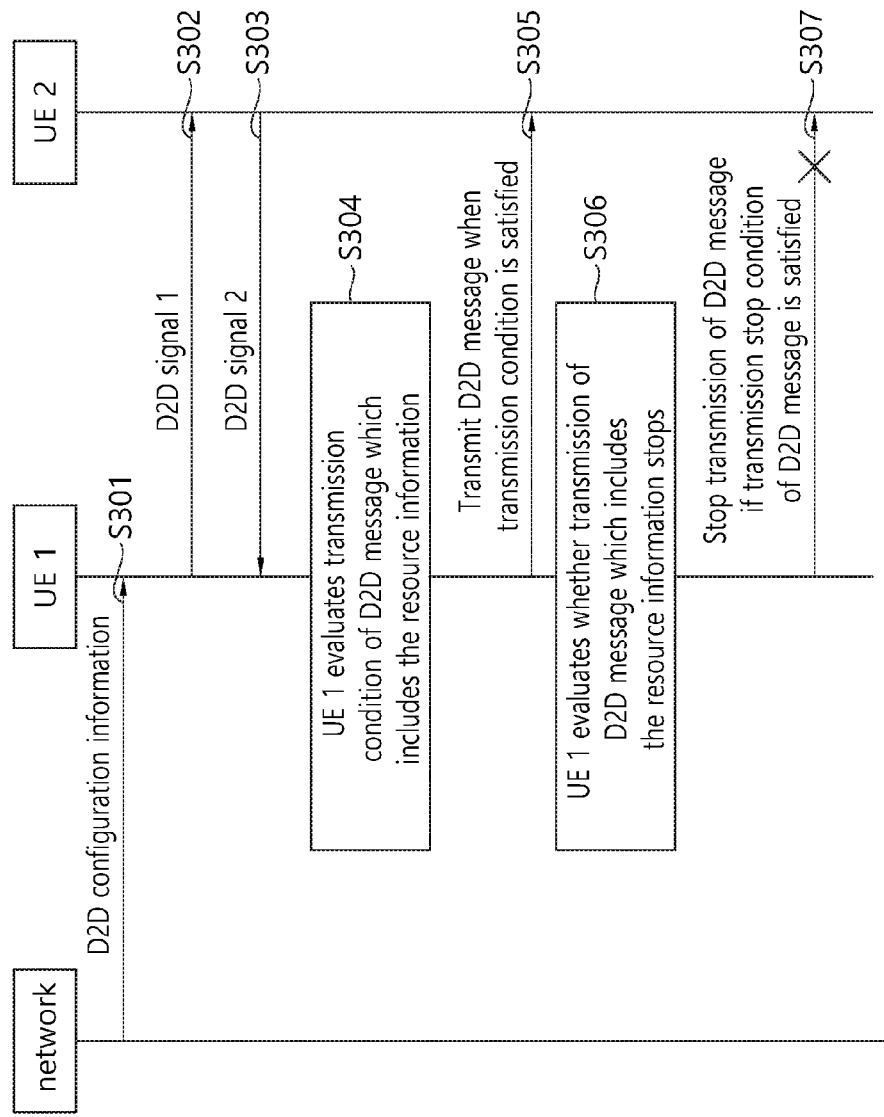
FIG. 23 illustrates a D2D operation method performed by UE according to an embodiment of the present invention.

FIG. 23 illustrates a D2D operation method performed by UE according to an embodiment of the present invention.

FIG. 23 illustrates an example of applying steps shown in FIG. 19 to FIG. 22.

The UE 1 is an UE located in the coverage of the network.

Referring to FIG. 23, a network transmits D2D configuration information the UE 1 (S301). The D2D configuration information may be the above first D2D configuration. The network may report a D2D resource available in the network coverage.

The UE 1 transmits a D2D signal 1 (S302). The D2D signal 1 may be a signal for inquiring whether different UEs are located outside the network coverage or there are the different UEs having no updated resource information.

The D2D signal 1 may include conditions and information on a requesting operation to be performed when the conditions are satisfied. The conditions have the case where a UE receiving the D2D signal 1 is located outside the network coverage or the UE receiving the D2D signal 1 does not include updated resource information. The operation may be a case of transmitting a response with respect to the D2D signal 1, that is, a D2D signal 2.

The UE 2 receives a D2D signal 1 transmitted from the UE 1. When the condition is satisfied, the UE 2 performs the operation (S303). That is, the UE 2 transmits a D2D signal 2.

The UE 1 evaluates a transmission condition of a D2D message (S304). In this case, the UE 1 may know that the UE 2 is located outside the network coverage or does not have updated resource information based on the D2D signal 2.

In this case, the UE 1 determines that there is a need to transmit a D2D message including resource information to transmit the D2D message (S305). The D2D message may be broadcasted.

After a time elapses, the UE 1 evaluates whether transmission of the D2D message stops (S306).

For example, if the transmission condition of the D2D message is satisfied no longer, the UE 1 may determine that a transmission stop condition of the D2D message is satisfied.

If the transmission stop condition of the D2D message is satisfied, the UE 1 stops transmission of the D2D message (S307).

According to the present invention, the UE 1 located in the network coverage transfers resource information to a UE 2 located outside the network coverage. If there is a need to transfer the resource information, the UE 1 transfers the resource so that unnecessary resource consumption may be reduced. In addition, a reliable D2D operation may be performed between UEs inside and outside the network coverage.

Figure 24:
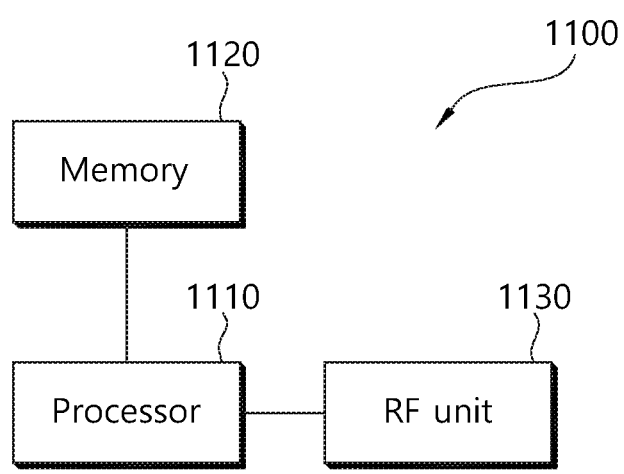
FIG. 24 is a block diagram illustrating a wireless device according to an embodiment of the present invention.

FIG. 24 is a block diagram illustrating a wireless device according to an embodiment of the present invention.

Referring to FIG. 24, a terminal 1100 includes a processor 1110, a memory 1120, and an RF unit 1130. The processor 1110 performs the proposed functions, processes and/or methods. For example, the processor 1110 may receive D2D configuration information from a network. When the transmission condition is satisfied, the processor 1110 may transmit a D2D message to another UE. D2D configuration information indicates a resource which may be used in a D2D operation in coverage of the network. The D2D message may include resource pool information indicating a resource which may be used in the D2D operation.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for device-to-device (D2D) operations in a wireless communication system, the method performed by a first user equipment (UE) and comprising:
    receiving, from a network, resource information of in-coverage;
    transmitting, to a second UE, a first D2D signal indicating a second D2D signal transmitting condition of the second UE after receiving the resource information of the in-coverage;
    receiving, from the second UE, a second D2D signal in response to the first D2D signal based on the second D2D signal transmitting condition;
    determining whether a condition of transmitting the resource information is satisfied based on the received second D2D signal; and
    transmitting, to the second UE, the resource information when the condition of transmitting the resource information is satisfied,
    wherein the resource information of the in-coverage indicates a resource which is used for the D2D operation within coverage of the network,
    wherein if the first UE is located within the coverage of the network and the second UE is located outside the coverage of the network, the condition of transmitting the resource information is satisfied and the first UE transmits the resource information for the in-coverage to the second UE, and
    wherein the first D2D signal indicates that, if the second UE discovers no synchronization signals transmitted from the network, the second D2D signal transmitting condition is satisfied.

2. The method of claim 1,
    wherein the first D2D signal comprises an identity (ID) of the second UE or operation requesting to the second UE.

3. The method of claim 2, wherein the operation requesting to the second UE is an operation of transmitting the second D2D signal being a response with the respect to the first D2D signal.

4. The method of claim 3, wherein the second D2D signal comprises at least one of the ID of the second UE, or an ID of the first D2D signal.

5. The method of claim 1, wherein when the resource information is transmitted to the second UE, the resource information is broadcasted.

6. A first user equipment (UE) for performing a D2D operation in a wireless communication system, the first UE comprising:
    a transceiver that transmits and receives radio signals; and
    a processor connected to the transceiver to be operated, wherein the processor
        controls to receive, from a network, resource information of in-coverage,
        controls to transmit, to a second UE, a first D2D signal indicating a second D2D signal transmitting condition of the second UE after receiving the resource information of the in-coverage;
        controls to receive, from the second UE, a second D2D signal in response to the first D2D signal based on the second D2D signal transmitting condition;
        determines whether a condition of transmitting the resource information is satisfied based on the received second D2D signal, and
        controls to transmit, to the second UE, the resource information when the condition of transmitting the resource information is satisfied,
    wherein the resource information of the in-coverage indicates a resource which is used for the D2D operation within coverage of the network,
    wherein if the first UE is located within the coverage of the network and the second UE is located outside the coverage of the network, the condition of transmitting the resource information is satisfied and the first UE transmits the resource information for the in-coverage to the second UE, and
    wherein the first D2D signal indicates that, if the second UE discovers no synchronization signals transmitted from the network, the second D2D signal transmitting condition is satisfied.

7. The method of claim 1, wherein, if the first UE further detects that the resource information which is indicated by the network is updated, the condition of transmitting the resource information is satisfied.

8. The method of claim 1, wherein, if the first UE further detects that the second UE does not get the resource information which is updated, the condition of transmitting the resource information is satisfied.

9. The first UE of claim 6:
    wherein the first D2D signal comprises an identity (ID) of the second UE and an operation requesting to the second UE.

10. The first UE of claim 9, wherein the operation requesting to the second UE is an operation of transmitting the second D2D signal being a response with the respect to the first D2D signal.

11. The first UE of claim 10, wherein the second D2D signal comprises at least one of the ID of the second UE, or an ID of the first D2D signal.

12. The first UE of claim 6, wherein, when the resource information is transmitted to the second UE, the resource information is broadcasted.

13. The first UE of claim 6, wherein, if the first UE further detects that the resource information which is indicated by the network is updated, the condition of transmitting the resource information is satisfied.

14. The first UE of claim 6, wherein, if the first UE further detects that the second UE does not get the resource information which is updated, the condition of transmitting the resource information is satisfied.

* * * * *